United States Patent [19]

Komuro et al.

[11] Patent Number: 4,650,932

[45] Date of Patent: Mar. 17, 1987

[54] KEY TELEPHONE SYSTEM

[75] Inventors: Isaku Komuro, Higashiyamato; Yoshikazu Sano, Hino, both of Japan

[73] Assignee: Kabushiki Kaisha Toshiba, Kawasakishi, Japan

[21] Appl. No.: 719,584

[22] Filed: Apr. 3, 1985

[30] Foreign Application Priority Data

Jun. 29, 1984 [JP] Japan .................................. 59-133315

[51] Int. Cl.⁴ ............................................ H04M 1/274
[52] U.S. Cl. ..................................... 379/164; 379/165
[58] Field of Search ............ 179/99 LS, 99 M, 18 AB, 179/99 R, 18 ES, 99 H, 81 C

[56] References Cited

U.S. PATENT DOCUMENTS

| | | | |
|---|---|---|---|
| 4,196,316 | 4/1980 | McEowen et al. | 179/18 ES |
| 4,203,011 | 5/1980 | Coriello | 179/99 M |
| 4,291,199 | 9/1981 | Densmore | 179/18 AB |
| 4,453,040 | 6/1984 | Wolf et al. | 179/99 LS |
| 4,491,693 | 1/1985 | Sano et al. | 179/99 R |
| 4,517,409 | 5/1985 | Nagasaki | 179/81 C |

Primary Examiner—Gene Z. Rubinson
Assistant Examiner—David R. Schuster
Attorney, Agent, or Firm—Finnegan, Henderson, Farabow, Garrett and Dunner

[57] ABSTRACT

In a key telephone system, when it is impossible to set at a time the entire operation data stored in a memory device of a key station unit by using a key of a specific key telephone set among a plurality of key telephone sets connected to the key station unit, the entire data of respective operation items are divided into a plurality of data sets and then the setting of the data of respective data sets are independently set. The division of the data of respective operation items is made corresponding to the output state of a hook switch, for example.

20 Claims, 11 Drawing Figures

KEY TELEPHONE SYSTEM

BACKGROUND OF THE INVENTION

1. Field of the Invention

This invention relates to a key telephone system comprising a key station unit and a plurality of key telephone sets connected thereto, and more particularly to a key telephone system wherein various operating data stored in a memory device of the key station unit can be set or altered by using keys of at least one of specific key telephone sets among the plurality of telephone sets.

2. Description of the Prior Art

There has been a known key telephone system in which various operating data stored in a memory device of a key station unit are set or altered by using a key(s) of a specific key telephone set among a plurality of telephone sets. In such a telephone system, for setting the operating data, various data regarding specific operation items are assigned to respective keys of the specific telephone set so as to set respective data according to the operation of the keys. For example, when 20 keys each associated with a luminous display device using LED are provided and when it is desired to set the office lines through which calling can be made from the 10th key telephone set, the setting is made in the following manner.

At first, a number, for example 3, representing an operation item corresponding to the setting of an office line capable of calling from the specific key telephone set, is inputted by a dial key. Then, a number, 10, representing that the data setting is executed with respect to the 10th key telephone set, is inputted by the dial key. Under this condition, the LED display device associated with a key corresponding to an office line capable of calling is lighted, while the LED display devices corresponding to other keys are not lighted. In other words, the office line assigned to a key associated with a lighted LED display device is capable of calling, whereas office lines assigned to keys associated with extinguished LED display devices are incapable of calling. When a key associated with a lighted LED display device is depressed, the LED display device is turned OFF. On the other hand, when a key associated with an extinguished LED display device is depressed, the display device is turned ON. In this manner, by the operation of the keys, the setting is changed from the state capable of calling to the state incapable of calling, and vice versa.

When the fact that the necessary data has been set is confirmed by the LED display device, a key, for example, a holding key "HOLD" for inputting data representing the fact that the setting has been completed is depressed. Thus, the setting of operating data for an office line capable of calling from the 10th telephone set is completed.

In the above described example, according to the prior art key telephone system, a maximum of only 20 of the data setting is possible corresponding to 20 keys provided in the specific key telephone set.

In the key telephone system of this type, the number of keys that can be used for the data setting of each key telephone set, that is, the number of keys associated with respective LED display devices has decreased in recent years for the purpose of the cost down of the system and easiness of the operation, and due to the fact that the number of office lines utilized for respective telephone set is generally smaller than that of the office lines utilized in the entire system. As a result, it often becomes impossible to set all data by a key telephone set utilized for the data setting.

SUMMARY OF THE INVENTION

Accordingly, it is an object of this invention to provide an improved key telephone system capable of setting operating data regardless of the number of keys, such as office line keys provided for each key telephone set.

According to this invention, there is provided a key telephone system comprising a key station unit and a plurality of key telephone sets connected to the key station unit wherein keys of at least one of specific telephone sets are used to set various operating data stored in memory means in the key station unit characterized in that there are provided judging means which judges as to whether or not the specific key telephone set can set at a time all data of one selected operation item by a key of the specific key telephone set, and processing means which changes the setting of respective data of the operation items for a plurality of data sets obtained by dividing the entire data when the judging means cannot set at a time the entire data of the operation items.

DESCRIPTION OF THE PREFERRED EMBODIMENT

Figure 1:
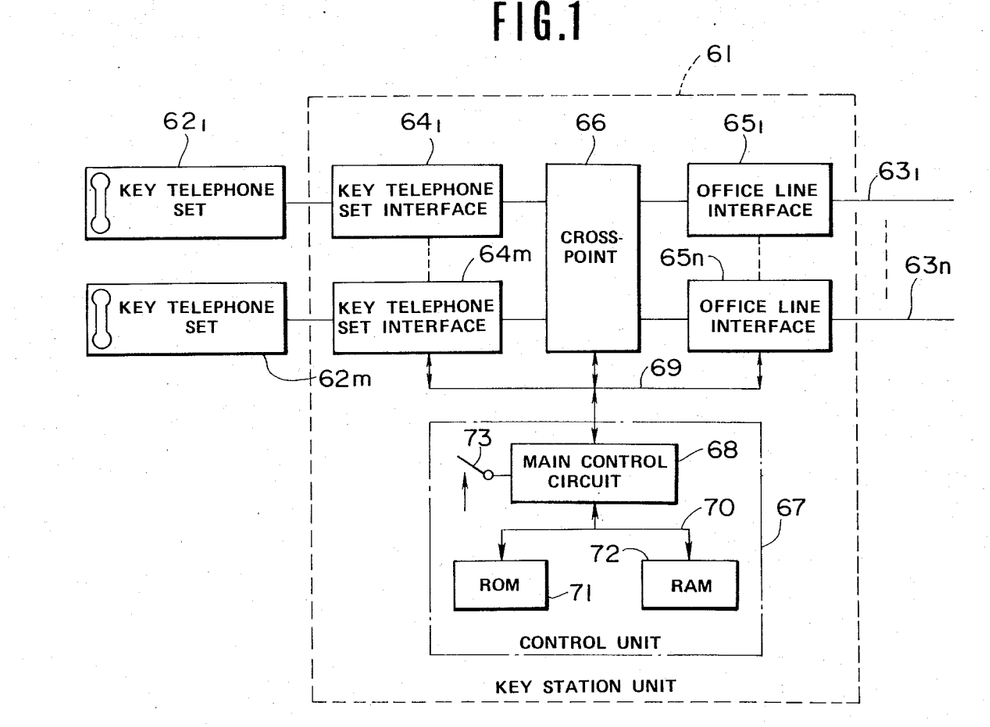
FIG. 1 is a block diagram showing the general construction of the key telephone system embodying the invention.

The key telephone system shown in FIG. 1 comprises a key station unit 61, a plurality of key telephone sets $62_1$ through $62_m$ and office lines $63_1$ through $63_n$. The key telephone sets $62_1$ through $62_m$ are respectively connected to key telephone set interfaces $64_1$ through $64_m$ installed in the key station unit 61, while office lines $63_1$ through $63_n$ are connected to office line interfaces $65_1$ through $65_n$ in the key station unit. The key telephone set interfaces $64_1$ through $64_m$ and office line interfaces $65_1$ through $65_n$ are interconnected by a cross-point 66. There is provided a control unit 67 including a main control circuit 68 which is connected to the key telephone interfaces $64_1$ through $64_m$, office line interfaces $65_1$ through $65_n$ and the cross-point 66 through a signal line 69. The main control circuit 68 is constituted by a processor and is connected to a ROM 71 and a RAM 72 via an internal bus line 70. Further, data for switching between an operation data set mode and an origination processing mode (normal operation mode) is applied to the main control circuit 68 through a transfer switch 73. The ROM 71 stores programs, etc. utilized in the main control circuit 68, while the RAM 72 stores the operation data or the like. The main control circuit 68 receives key operating data, and hook switch ON.-OFF data from the key telephone sets $62_1$ through $62_m$ and sends out the data displayed by the luminous diode display devices. Furthermore, the main control device 68 receives ringing data via office line interfaces $65_1$ through $65_n$ and the signal line 69 and sends out the selection number data. The main control circuit 68 controls the cross-point 66 via signal line 69 so as to mutually connect the key telephone set interfaces $64_1$ through $64_m$ to enable local talkings. Further, the main control circuit 68 interconnects key telephone set interfaces $64_1$ through $64_m$ and office line interfaces $65_1$ through $65_n$ to enable office line talkings.

Figure 2:
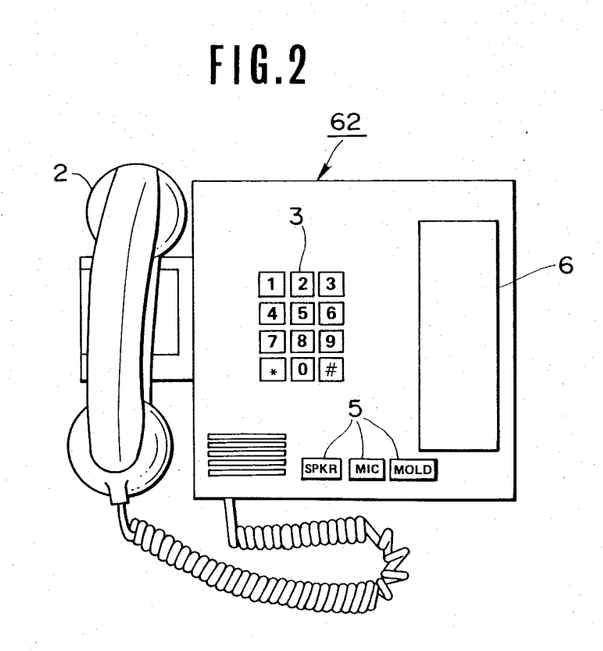
FIG. 2 shows one example of the key telephone set utilized in the key telephone system shown in FIG. 1.
Figure 3:
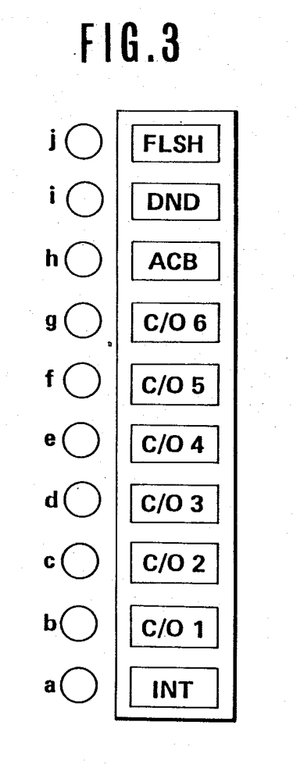
FIG. 3 shows one example of a key array of the key telephone set shown in FIG. 2.

Referring to FIG. 2 a key telephone set $62_1$, one of the key telephone sets $62_1$ through $62_m$, comprises dial keys 3, function keys 5 such as a hold key "HOLD", a microphone key "MIC" and a loudspeaker key "SPKR" and luminous diode display devices 6 corresponding to the office line keys. As shown in FIGS. 3, the display devices 6 is constituted by a local line key "INT", local line keys "C/01" through "C/06", a call rejection key "DND", a flash key "FLSH" and luminous diodes display devices a through j corresponding thereto.

Figure 4:
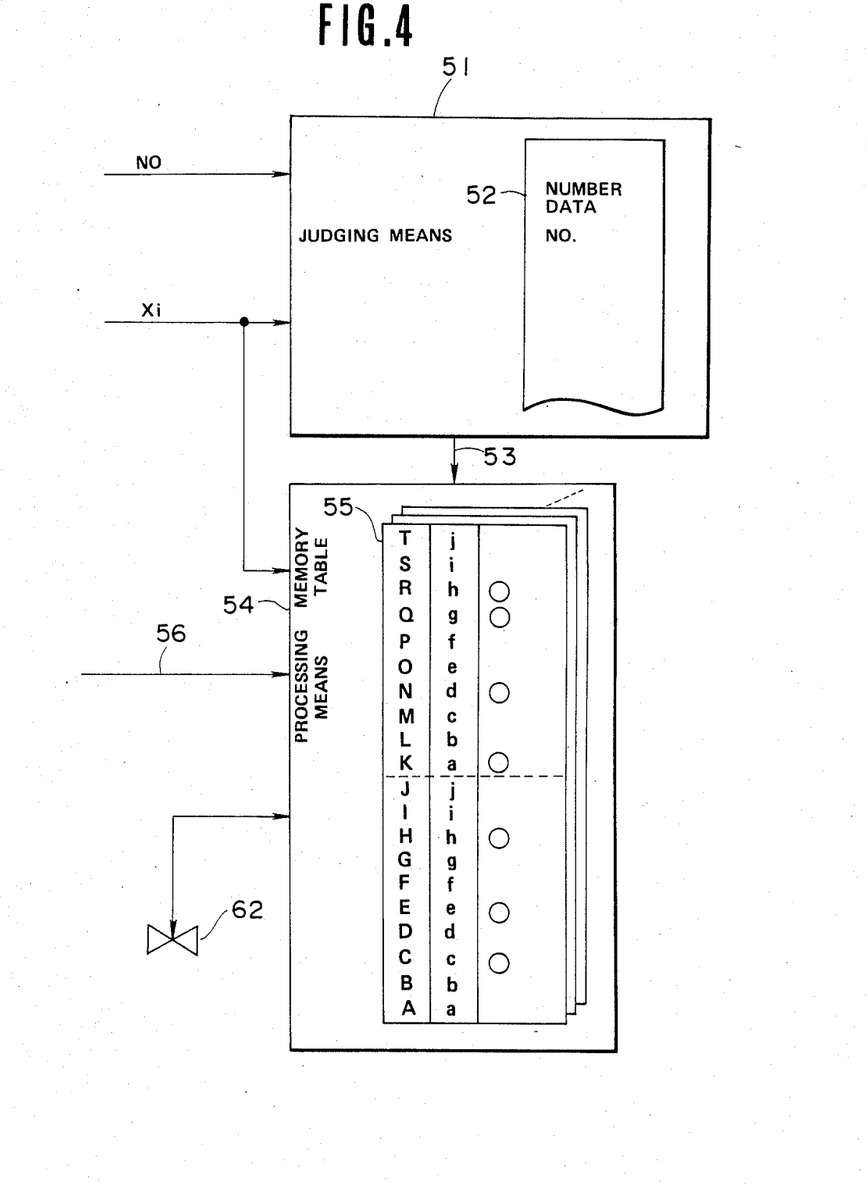
FIG. 4 is a performance block diagram useful to explain the key telephone system of this invention.

FIG. 4 is a block diagram showing the construction and performance of the control unit 67 shown in FIG. 1. As shown, the control unit 67 comprises judging means 51 which judges whether or not a data input is sent from a key telephone set which is provided with pairs of keys that cannot set various operation data at a time and corresponding luminous diode display devices with respect to respective operation items $X_1, X_2, X_3, \ldots$ For example, a key telephone set utilized to set the operation data outputs data (flag) showing that whether the key telephone set can simultaneously set various operation data or not when the data is inputted when the key is operated. Judging means 51 performs its judgment based on this data each time an operation item $X_i$ arrives at. The data produced by a key has a redundancy and its one bit is used as the flag. The judging means 51 is provided with a memory table for number data No of a key telephone set interface for setting the operation data so as to check whether the data received at the time of setting the operation data is inputted from a key telephone set connected to a specific key button telephone interface or not, this preventing the alternation of the operation data made by a setter other than an authorized operation data setter.

When supplied with an operation data from a button telephone set connected to a given key telephone set interface, the judging means judges that whether the operation data of that key telephone set can be set at a time or not and outputs the data representing the result of judgment. Processing means 54 comprises a memory table 55 storing the operation data for respective operation items. The processing means 54 is inputted with data Xi representing the operation items, judgment result data 53, and hook switch ON.OFF data 56 which are specific data. The processing means 54 is connected to a key telephone set 62 utilized for setting the operation data. Furthermore, the processing means 54 is supplied with data Xi-representing the operation items, and the judgment result data 53 so that when the judgment data 53 shows a simultaneously settable state, the processing means 54 sends operation data of the memory table 55 corresponding to data Xi representing the operation items to the key telephone set 62 so as to display the set state of the present operation data on the luminous diode display devices. When a key of the key telephone set 62 is operated, the processing means 54 changes the setting of the operation data in the memory table 55 in accordance with the received data and sends the operation data after changing to the key telephone set 62. The processing means 54 is given with data Xi representing the operation items and the judgment result data 53 and when the judgment result data 53 shows a state in which it is impossible to set simultaneously, the processing means divides the operation data stored in the memory table 55 corresponding to the data Xi representing the operation items based on the ON.OFF data and then sends the divided data to the key telephone set 62, thus displaying a portion of the set state of the present operation data on the luminous diode display devices. Upon operation of a key of the key telephone set 62, the processing means 54 changes the setting of a portion corresponding to the operation data stored in the memory table 55 in accordance with the data, and the processing means 54 also sends to the key telephone set 62 the operation data after changing to also change the display on the luminous diode display devices. At this time, when there is a change in the ON.OFF data, the processing means 54 executes similar processing to that described above by using remaining operation data of the same operation items. When supplied with the operation data of the hold key "HOLD" (included in the function keys 5 shown in FIG. 21) the processing means 54 positively sets the operation data regarding the operation items.

In the memory table 55 are shown the operation data for the operation item $X_2$, for example, and the operation item $X_2$ sets the office lines through which calling signals can be transmitted, the operation item $X_2$ comprising 20 data of from A through T, and representing the data regarding the 10th telephone set. In this case, the processing means 54 processes the operation data by dividing them into two parts or sets as shown by broken lines. More particularly, when the ON.OFF data 56 shows an on hook state, the operation data of the lower half of the memory table 55 shown in FIG. 5A are displayed, whereas when the ON.OFF data 56 shows an off hook state, the operation data of the upper half of the memory table 55 shown in FIG. 5B are displayed. In each display state, change of the setting of the operation data is made possible by the operation of a key corresponding to a luminous diode display device.

As above described, for the operation items that cannot be set at a time by the key of a key telephone set, the display of the operation data and change of the setting of one operation item are made separately by the operation of a hook switch.

The data setting changing operation of the key telephone system will be described with reference to the flow charts shown in FIGS. 6 through 8. The program corresponding to these flow charts are stored in the ROM 71 of the control unit 67 shown in FIG. 1.

Figure 6:
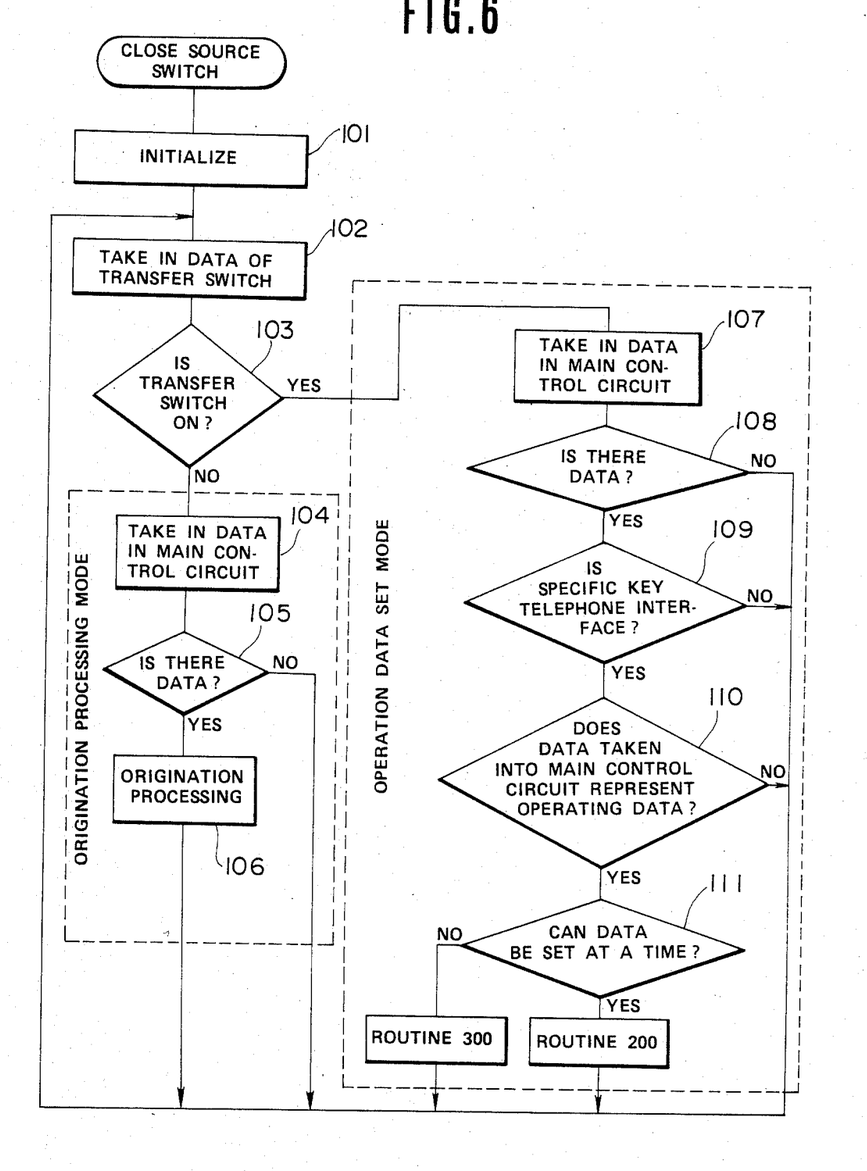
FIGS. 6 through 8 are flow charts for explaining the operation of the key telephone system according to this system.

As shown in FIG. 6, when a source switch, not shown, of the key telephone system is closed, at step 101, the main control circuit 68 executes initialization. Then at step 102, the main control circuit 68 takes in the operation data of the transfer switch 73, and at step 103 a check is made as to whether the operation data is in a set mode (ON) or not. When the result of check is NO, at step 104, the main control circuit 68 takes in the data and then at step 105, a check is made as to whether there is data or not. When there is the data, at step 106, an origination processing, for example, a local line calling, an office line origination, an office line ringing, etc., are executed based on the taken in data. When the step 106 is executed, or when the result of check executed at step 105 is NO, the program is returned to step 102 to repeat the steps 102 through 106.

When the result of check at step 103 is YES, that is, when the transfer switch 73 is ON, at step 107 in the operation mode or set mode, the main control circuit 68 takes in the data. Then, at step 108 a check is made as to whether there is data or not. When the result of check is YES, at step 109 a check is made as to whether the input is sent from a specific key telephone set interface or not. If the input is not an input from a predetermined specific key telephone interface or interfaces, there is a probability that the change of the setting of the operation data might be made by an error. In such case, the program is returned to step 102 without executing the processing based on the data taken in. When the result of check at step 109 is YES, at step 110, the main control circuit 68 confirms that the data taken in is the data showing the operation data. When the result of check at step 110 is YES, at step 111, a check is made as to whether the setting can be made at a time or not based on the flag of the data representing the operation items. At step 109, the main control circuit 68 detects the number data of a key telephone set interface connected to a key telephone set utilized for setting the operation data, and at step 111 detects the flag in the data representing the operation items so that the main control circuit 68 performs as the judging means 51 shown in FIG. 4.

At step 111, when it is judged that it is possible to set the data at a time, the program is advanced to a routine 200 for displaying all operation data and changing the setting. At step 111, when it is judged that it is impossible to set at a time, the program is advanced to a routine 300 for separately displaying the upper and lower halves of the operation data shown in the memory table 55 in FIG. 4 and for changing the divided settings.

Figure 7:
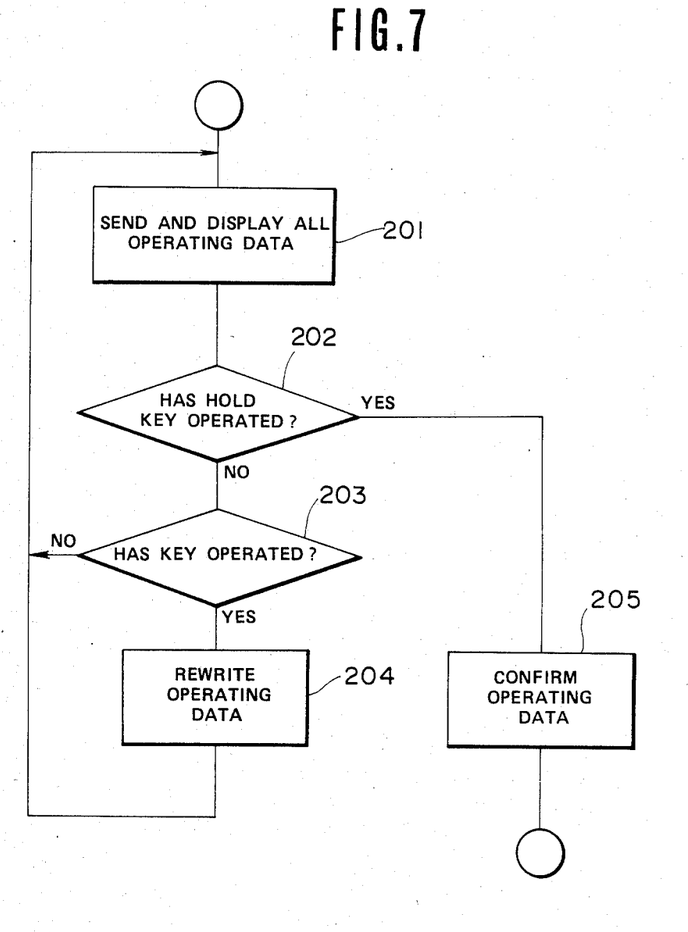

FIG. 7 shows the flow chart of routine 200. At step 201, the main control circuit 68 sends to a key telephone set, now setting the operation data, all operation data regarding one operation item designated previously for displaying the set state on the luminous diode display device. Then at step 202, the main control circuit 68 checks whether the hold key "HOLD", that is, a key that determines the set state of the operation data, has operated or not. When the result of the check is NO, at step 203, the main control circuit 203 checks whether a key has been operated for the purpose of changing the operation data. When the result of check executed at step 203 is YES, at step 204, the main control circuit 68 rewrites the operation data in RAM 72. After that, the program is returned to step 201 at which the set states of the operation data following the rewriting are displayed on the luminous diode display devices. When the result of check at step 202 is YES, at step 205 the main control circuit 68 confirms the setting of the operation data and then the program is returned to step 102 shown in FIG. 6.

Figure 8:
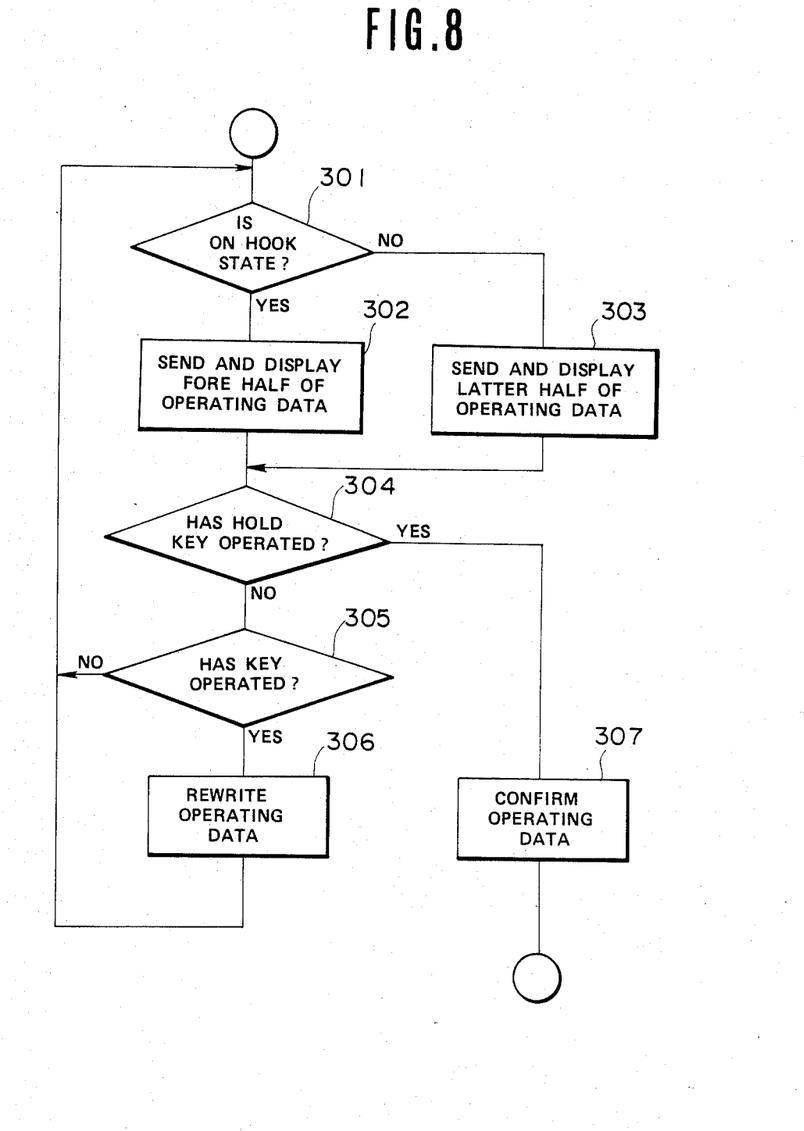

FIG. 8 shows the flow chart of routine 300 shown in FIG. 6. More particularly, at step 301, the main control circuit 68 judges that the handset has been hook off or not according to the ON.OFF data of the hook switch. When the result of this judgment is YES, at step 302, the operation data of the fore half of one operation item designated previously is sent to a telephone set now setting the operation data for displaying the set state on the luminous diode display device. If the result of judgment at step 301 is NO, at step 303 the operation data of the latter half of one operation item designated previously are sent to a telephone set now setting the operation data for displaying the set operation state on the luminous diode display device.

Figure 5:
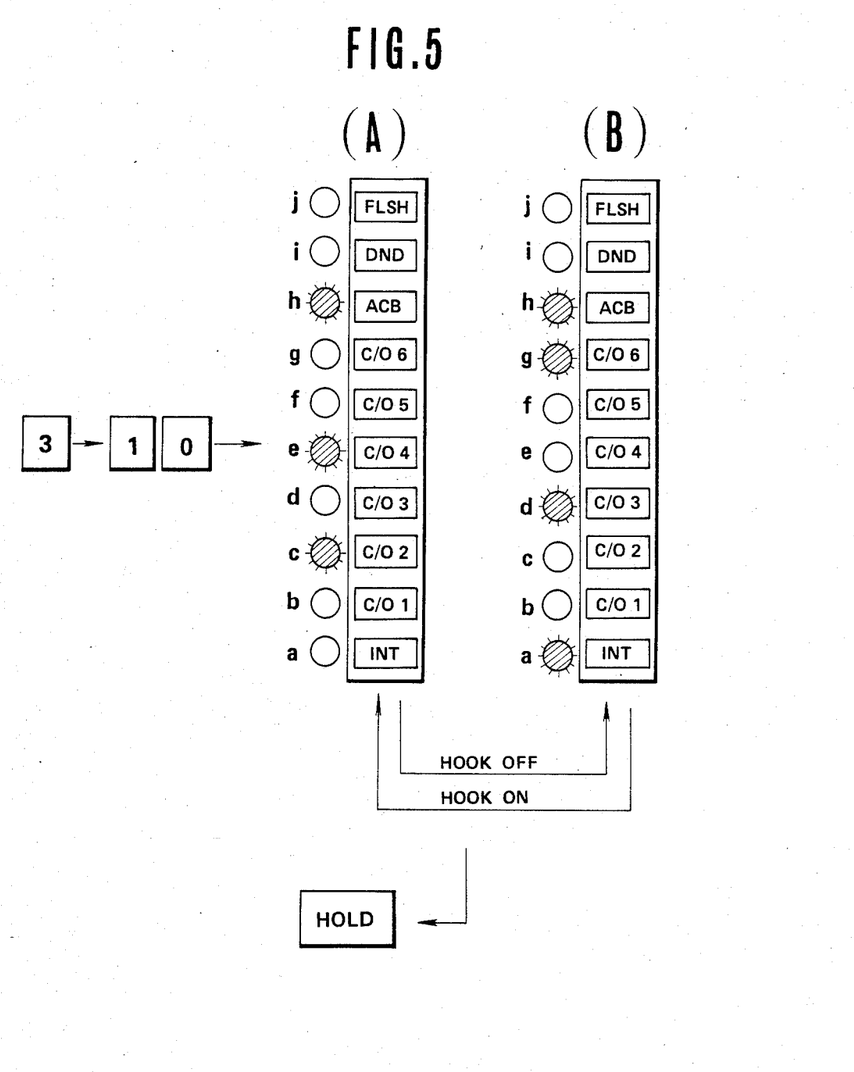
FIG. 5 shows one example of the setting of the operation data according to this invention.

At the succeeding steps 304 through 307, the main control circuit 68 changes the setting of the operation data of the fore or latter half, but its operation is the same except that the accessed regions of RAM 72 are different. At step 304, the main control circuit 68 checks whether the hold key, that is, a key that confirms the set state of the operation data has been operated or not. When the result of this check is NO, at step 305, the main control circuit 68 judges whether a key for changing the operation data has been operated or not. When the result of check at step 305 is YES, at step 306, the main control circuit 68 rewrites the operation data in RAM 72. After that, the program is returned to step 301 at which a judgment is made as to whether a handset is hooked on or hooked off, and at step 302 or 303 the state of setting of the rewritten operation data is displayed on the luminous diode display device. At step 304, when it is judged that the hold key "HOLD" has been operated, at step 307, the main control circuit 68 confirms the operation data. Then the program is returned to step 102 shown in FIG. 6. One example of the setting operation of the operation data according to this flow chart is shown in FIG. 5.

With the procedures described above, it is possible to set the operation data regardless of the number of pairs of the keys and the display devices.

Although in the embodiment described above, the data showing whether it is possible to set the data at a time was sent from a key telephone set utilized to set the operation data, it is also possible to register in the key station unit the number of pairs of the keys of a key telephone set utilized for setting the operation data and the display devices for judging whether it is possible to set at a time for each operation item.

Further, in the foregoing embodiment, an operation item corresponding to a value 3 that sets the office line through which the 10th telephone set can transmit signals was described, the settings of other operation items can be made similarly.

Figure 9:
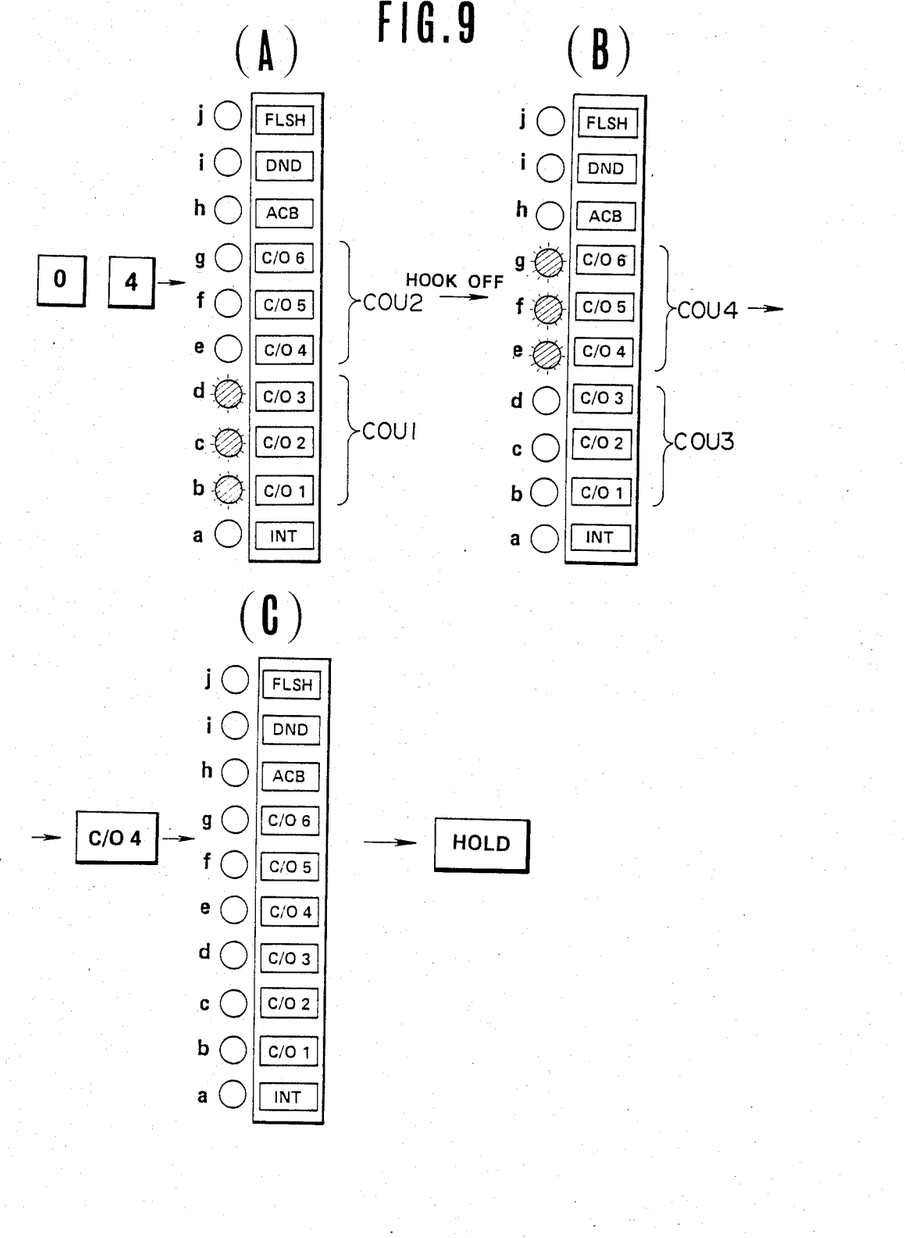
FIGS. 9 through 11 show other examples of the setting of the operation data according to this invention.

FIGS. 9A, 9B and 9C show one example of changing the setting of the data regarding the operation data that transfers between a multifrequency system and a dial pulse system of the office lines contained in the system. In this case, 12 office lines are divided into 4 sets COU1 through COU4 each including three office lines so that the change of the setting is made for respective sets of three office lines. FIGS. 9A, 9B and 9C show a case in which the setting of office lines of the set COU is changed from the multifrequency system to the dial pulse system. The operation data item effecting the setting of the dial pulse system or the dial pulse system corresponds to a value "04", whereas in the case of the multifrequency system, a luminous diode corresponding to a key of the office line is lighted. On the other hand, in the case of the dial pulse system, the luminous diode corresponding to the key of the office line is turned OFF.

At first the data "04" corresponding to the operation item is set by a dial key. Then the state of lighting of the luminous diodes corresponding to respective keys would be shown by FIG. 9A which shows the setting states of the first to 6th office lines corresponding to sets COU1 through COU2. This state shows that the office lines belonging to the set COU1, that is the first to third office lines are set to the multifrequency system. Then when the handset is hooked off to open the hook switch, the state of lighting of the luminous diode changes to that shown in FIG. 9B which shows the states of settings of the 7th to 12th office lines corresponding to the sets COU3 through COU4 and that office lines belonging to set COU4, that is the 10th to 12th office lines are set to the multifrequency system. When key "C/04" is depressed for the purpose of transferring the 10th to 12th office lines belonging to the set COU4 from the multifrequency system to the dial pulse system the states of respective luminous diodes become to the state shown in FIG. 9C showing that the office lines belonging to the set COU4 have been changed to the dial pulse system. Then the hold key HOLD is depressed so that the data of the operation data item are ensured.

In the foregoing embodiment, the signal of a hook switch which becomes ON or OFF according to the state of a handset is utilized to enable the data setting in two groups of the operation item. When setting the data of operation items, the method of dividing the data by utilizing a signal from the hook switch is advantageous because the state of the hook switch can readily be confirmed with eyes based on the state of the handset. It should be understood that in this invention, a similar construction can be made by utilizing a signal from an element other than the hook switch.

Figure 10:
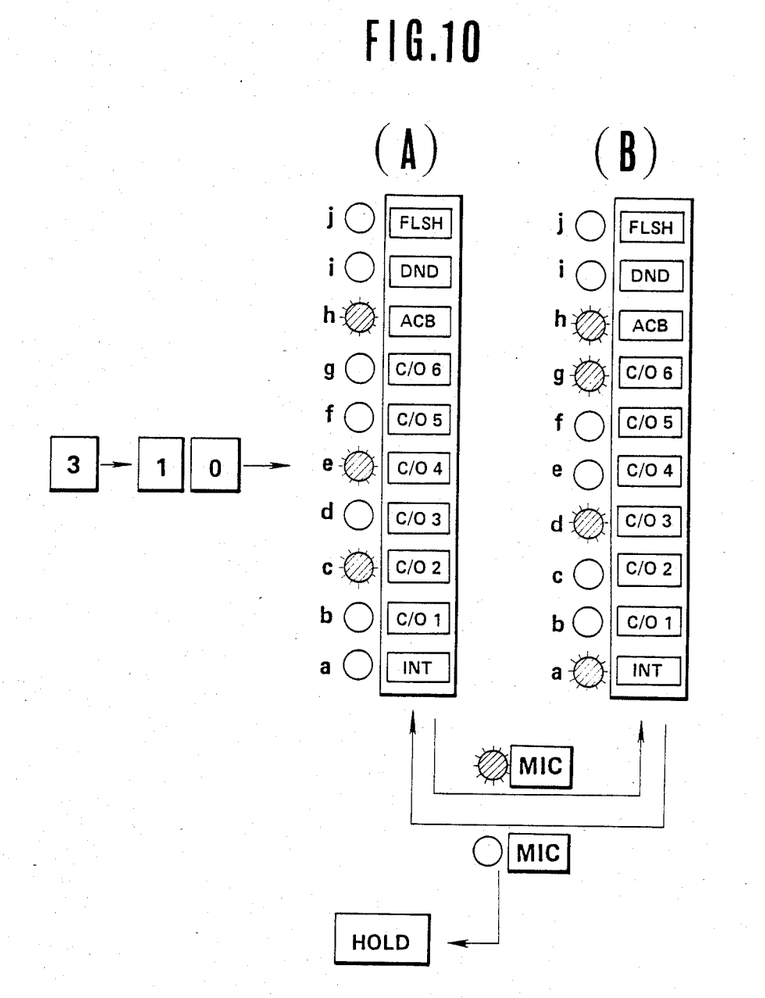

FIGS. 10A and 10B show a modification in which each data of the setting operation item is divided and then set by utilizing a microphone key "MIC", one of the function key 5 shown in FIG. 2. In this case, a luminous diode is disposed near the microphone key "MIC" for visually confirming the operating state of the microphone key "MIC". For example, when dial keys 3 and 10 are depressed for the purpose of changing the office line through which the 10th key telephone set can transmit signals, the states of lighting of the luminous diodes of respective keys would be shown by FIG. 10A. Under this state, the luminous diode near the microphone key "MIC" is turned OFF. Then when the microphone key "MIC" is depressed, the luminous diode near it is turned ON, so that the states of lighting of the luminous diodes near respective keys would be shown by FIG. 10B. As above described, after operating respective keys at respective states corresponding to the operating state of the microphone key "MIC", and then depressing the hold key "HOLD" the settings of the data of a total of 20 can be changed.

Figure 11:
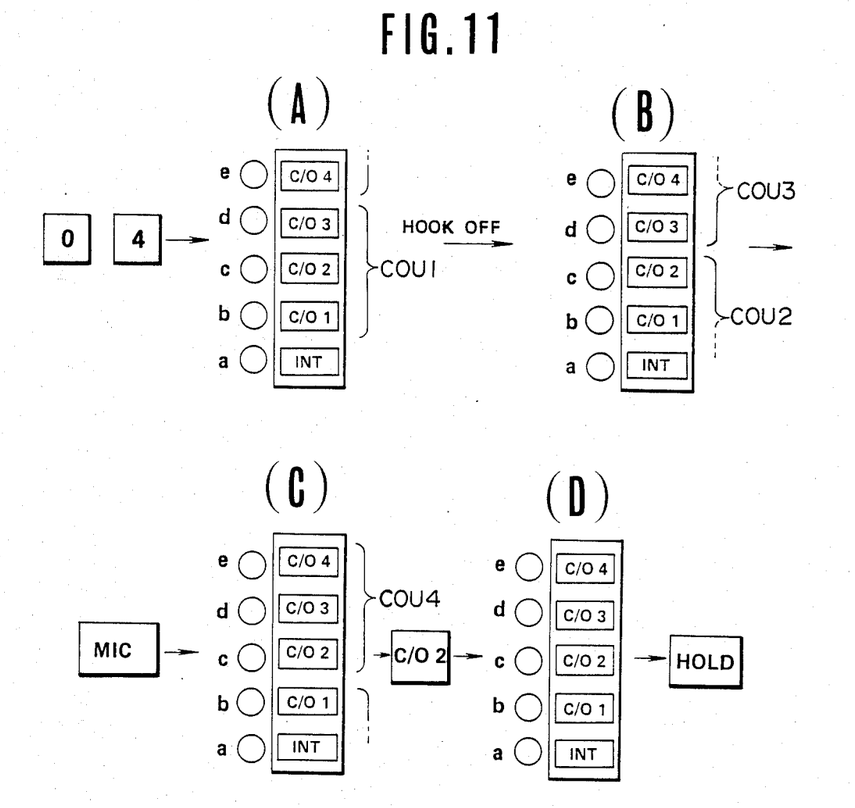

FIGS. 11A through 11D show a modification in which each data is divided and then set by combining a hook switch and a microphone key "MIC". In this case, by combining the states of the hook switch and the microphone key, it is possible to divide the data to be set into four sets at the maximum. But in the following, the number of divisions is three. In the example shown in FIGS. 11A through 11D, the change of settings shown in FIG. 7 is possible when 5 keys are used. For example, when dial keys "0" and "4" are depressed, the content of the setting of a portion of sets COU1 and COU2 can be confirmed as shown in FIG. 11A. Under this state, when the handset is hooked OFF, the contents of settings of a portion of the set COU2 and a portion of set COU3 can be confirmed. As the microphone key "MIC" is depressed under this state, the contents of the settings of a portion of the set COU3 and of the set COU4 can be confirmed. Under the states shown in FIGS. 11A, 11B and 11C, when a suitable key is depressed, the contents thereof can be changed. When the key "C/02" is depressed under the state shown in FIG. 11C, this key will produce a signal that turns OFF a luminous diode corresponding to "4". After that, as the hold key "HOLD" is depressed, the office lines belonging to the set COU4 are changed from the multifrequency system MF to the dial pulse system.

Although in the foregoing embodiment the operation data was set by using a specific key telephone set, any one of a plurality of key telephone sets can be used.

What is claimed is:

1. A key telephone system for setting operating data associated with at least one of a plurality of operations, comprising:

a key station unit having a memory means with separate regions for storing each separate item of operating data;

a plurality of key telephone sets connected to the key station unit, each having a plurality of keys, with at least one specific key telephone set adapted so that each separate item of operating data can be sent to the key station unit and stored in the memory means using one of a plurality of predetermined keys on the specific key telephone set;

means for indicating that the number of separate items of operating data associated with the operation is greater than the number of predetermined keys on the specific key telephone set;

switch means that is controllable by an operator at the specific key telephone set for providing switch data to the key station unit, the state of which is used to differentiate between separate items of data sent by any one of the plurality of predetermined keys when the number of separate items of data is greater than the number of predetermined keys;

means for controlling input of each separate item of operating data into the separate regions of the memory means, which receives and is responsive to the state of the switch data and the indication from the indicating means that the number of separate items of operating data associated with the operation is greater than the number of predetermined keys, so that data sent from one of the plurality of predetermined keys will be stored in separate regions of the memory means in accordance with the state of the switch data provided by the switch means.

2. The key telephone system as set forth in claim 1, wherein the switch means comprises a hook switch that can be either opened or closed.

3. The key telephone system as set forth in claim 2, further comprising selecting means that is controllable by an operator at the specific key telephone set, for sending selection data to the key station unit that enables setting of the operating data associated with at least one selected operation of a plurality of operations.

4. The key telephone system as set forth in claim 3, wherein the selecting means comprises a plurality of dial keys at the specific key telephone set, such that the selection data is sent to the key station unit by operating a dial key having a numerical value corresponding to the operation to be selected.

5. The key telephone system as set forth in claim 1, wherein the switch means comprises a key on the specific key telephone set other than the predetermined keys.

6. The key telephone system as set forth in claim 2, wherein the switch means further comprises a key on the specific key telephone set other than the predetermined keys.

7. The key telephone system as set forth in claim 2, wherein each separate item of operating data associated with the operation has two possible states, and the operation of one of the plurality of predetermined keys sets each said item to one of its two possible states.

8. The key telephone system as set forth in claim 7, further comprising display means at the specific key telephone and operatively connected to the memory means for indicating the state of the separate items of operating data associated with the operation.

9. The key telephone system as set forth in claim 8, wherein the display means comprises a separate LED corresponding to each of the plurality of predetermined keys.

10. The key telephone system as set forth in claim 9, wherein the input controlling means further comprises means for controlling output of each separate item of operating data associated with the operation from the separate regions of the memory means to the specific key telephone, and which is responsive to the state of the switch data and to the indication from the indicating means, so that the LED corresponding to each of the predetermined keys will indicate the state of the separate item of operating data that can be set by operation of that predetermined key.

11. The key telephone system as set forth in claim 10, further comprising a plurality of telephone lines connected to the key station unit that can be accessed by the key telephone sets, the number of telephone lines being greater than the number of predetermined keys, and in which the operation of the predetermined keys and the switch means can be used to select the telephone lines that a telephone set can access.

12. The key telephone system as set forth in claim 4, wherein the plurality of operations that can be varied include the selection of the telephone lines that a telephone set can access.

13. The key telephone system as set forth in claim 12, wherein the plurality of operations include the selection of whether a telephone line is in a dial pulse mode or a multifrequency mode.

14. A method for setting operating data associated with at least one of a plurality of operations in a key telephone system comprising a plurality of key telephone sets, comprising the steps of:

selecting at least one operation of a plurality of operations for which operating data is to be set;

operating one of a plurality of predetermined keys at a specific key telephone set and thereby generating an item of operating data;

operating a switch means at the specific key telephone set and thereby generating switch data for differentiating between each separate item of operating data generated by one predetermined key;

controlling the input of each separate item of operating data from the specific key telephone set into a memory in a key station unit connected to the plurality of key telephone sets, including separate items of operating data generated by one predetermined key when the number of separate items of operating data associated with the selected operation is greater than the number of predetermined keys, by addressing different regions of the memory depending on the predetermined key operated and on the switch data generated by operation of the switch means; and storing at a different address in the memory each separate item of operating data.

15. The method as set forth in claim 14, wherein the step of operating a switch means comprises setting a hook switch on the specific key telephone set in one of the on-hook and off-hook states.

16. The method as set forth in claim 15, wherein the step of storing each separate item of operating data comprises storing each separate item in one of two states in the memory and changing the state whenever the predetermined key corresponding to said separate item is operated.

17. The method as set forth in claim 16, further comprising the step of displaying at the specific key telephone set the state of an item of operating data.

18. The method as set forth in claim 15, wherein the step of selecting at least one operation comprises generating selection data by operating a dial key at the specific key telephone set having a numerical value corresponding to the selected operation.

19. The method as set forth in claim 18, wherein the step of operating a switch means further comprises operating a key on the specific key telephone set other than one of the predetermined keys.

20. The method as set forth in claim 17, further comprising the step of selecting a telephone line that one of the plurality of telephone sets can access in response to the storing of operating data in a corresponding address in the memory.

* * * * *